UNITED STATES PATENT OFFICE.

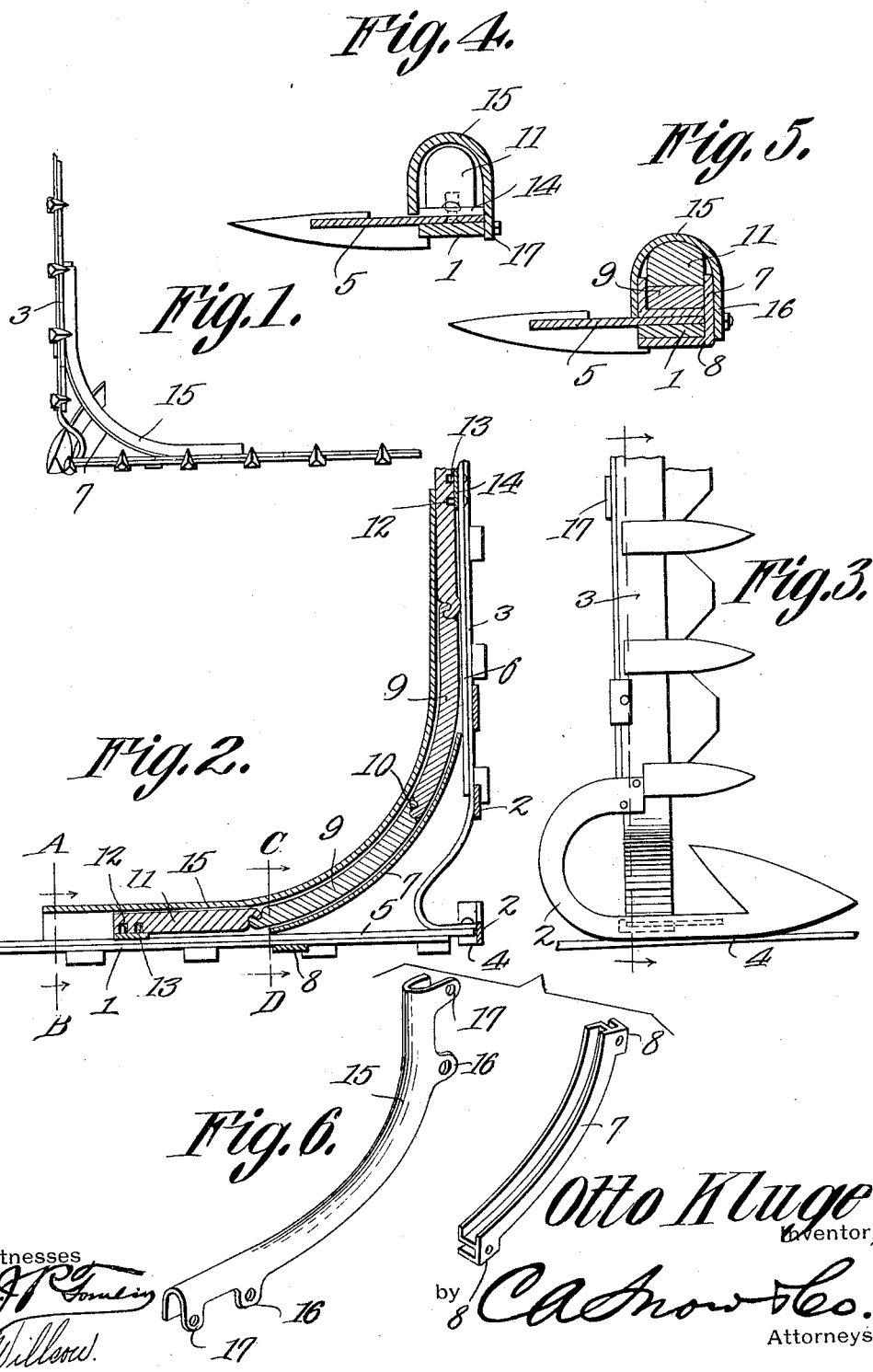

OTTO KLUGE, OF GOLCONDA, ILLINOIS.

MOWING-MACHINE.

1,102,929.      Specification of Letters Patent.      Patented July 7, 1914.

Application filed April 10, 1913. Serial No. 760,314.

*To all whom it may concern:*

Be it known that I, OTTO KLUGE, a citizen of the United States, residing at Golconda, in the county of Pope and State of Illinois, have invented a new and useful Mowing-Machine, of which the following is a specification.

This invention relates to mowing machines of that type utilizing both horizontally and vertically movable cutter bars, one of the objects of the invention being to provide cutter bars so arranged relative to each other as to coöperate to produce a square cut, the two cutter bars working along intersecting paths.

Another object is to provide an improved connection between the horizontal and vertical finger bars, this connection constituting an efficient brace and likewise means for turning the cut grain laterally so that it will not fall upon the standing grain.

A further object is to provide a connection of this character constituting a guide and housing for improved power transmitting means whereby motion is transmitted from one cutter bar to the other.

Another object is to provide a device of this character, the working parts of which are readily accessible and can be easily disconnected for the purpose of repairing and replacing them.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a rear elevation of a portion of a mower having the present improvements combined therewith. Fig. 2 is a central vertical section through the parts illustrated in Fig. 1. Fig. 3 is a side elevation. Fig. 4 is a section on line A—B Fig. 2. Fig. 5 is a section on line C—D Fig. 2. Fig. 6 is a perspective view of the combined brace and guide, the parts thereof being separated.

Referring to the figures by characters of reference 1 designates a horizontally extending finger bar on one end of which is secured a substantially U-shaped bracket 2 extending upwardly and attached to a vertical finger bar 3 the lower end of which is curved inwardly and then outwardly and is secured to the end of the finger bar 1. A shoe 4 is extended forwardly from that end of the bar 1 to which the bracket 2 is attached and the lower end of this vertical finger bar is arranged slightly above the plane of movement of a cutter bar 5 mounted to reciprocate as ordinarily upon the horizontal finger bar 1. Another cutter bar 6 is mounted to reciprocate upon the vertical finger bar 3. An arcuate and channeled guide member 7 is disposed in the angle formed by the two finger bars and is provided, at each end, with an angular bracket 8 adapted to extend back of the adjacent finger bars. Furthermore one of these brackets extends under the horizontal finger bar and is secured thereto in any suitable manner while the other bracket extends along the outer side of the vertical finger bar and is secured thereto. Mounted within this channeled guide and brace are arcuate links 9 having interfitting hooked ends 10 and the said links likewise interengage with the ends of the bars 11 which extend beyond the ends of the guide and are provided in those ends thereof remote from the guide with transverse notches 12. These notches receive lugs 13 or the like extending from plates 14 which are riveted or otherwise secured upon the adjacent cutter bars 5 and 6. The connections between the bars 11 and links 9 are similar to the connections 10 so that the links are permitted to swing slightly relative to the bars 11 and to be easily disconnected therefrom.

For the purpose of holding the links and bars in proper position relative to each other and to the guide, an arcuate hood 15 which is U-shaped in cross sectional contour, is arranged above the guide 7 and beyond the ends thereof, this hood straddling the guide and being provided with ears 16 adapted to be attached to the brackets 8. Brackets 17 are provided at the ends of the hood and are adapted to extend back of the respective finger bars and to be secured thereto.

It is to be understood that the horizontal cutter bar is to be actuated in any preferred manner. When this cutter bar is shifted to the right, the bar 11 which moves therewith, will push against the links 9 and cause said links to slide upwardly within the curved guide and within the hood 15 so as to push on the upper bar 11 and cause the vertical cutter bar to move upwardly, thus withdrawing the lower end of said vertical cutter bar 6 out of the path of said horizontally movable cutter bar 5. When said bar 5 is moved toward the left the operation is reversed, said cutter bar being shifted out of the path of the descending vertical cutter bar 6. It will be seen that the two cutter bars are disposed to work along intersecting paths and will produce a right angle cut. The hood 15 operates to hold the links and bars 9 and 11 respectively, against displacement relative to each other and also to protect them from material which might clog them and thus interfere with their operation. Furthermore the hood and the guide 7 are adapted to engage the cut grain and to shift it inwardly away from the standing grain so that the said cut grain will not fall on the standing grain and throw it over and thus render it difficult to cut. By disconnecting the ears 16 and brackets 17 from the finger bars, the hood 15 can be lifted out of position, thus exposing the links 9 and bars 11 which can be separated from each other and from the cutter bars, as will be obvious.

What is claimed is:—

1. A mowing machine including horizontally and vertically disposed finger bars, cutter bars movable upon the respective finger bars and each adapted to cut across the path of the other, and means for transmitting motion from one cutter bar to the other, said means including a series of detachably connected links, having interfitting hooked ends, outstanding lugs upon the cutter bars, the end links of the series having recesses to receive the lugs, and means extending longitudinally over the links for holding the links together and in engagement with the lugs.

2. The combination with horizontally and upwardly extended finger bars and cutter bars mounted to reciprocate upon the respective finger bars, of an arcuate channeled guide connecting the finger bars and constituting a brace, an arcuate housing straddling said channeled guide and secured to the finger bars, connecting lugs extending at right angles from the respective cutter bars and movable into the housing with the cutter bars, bars slidably mounted in the end portions of the housing and having recesses for the reception of the respective lugs, said bars being detachable from the lugs, and interfitting links detachably connected to each other and to said detachable bars, said links and detachable bars being mounted to work within the housing and being held together and to the lugs by the housing.

In testimony that I claim the foregoing as my own, I have hereto affixed my signature in the presence of two witnesses.

OTTO KLUGE.

Witnesses:
 THOS. H. CLARK,
 CARRIE HART.

---

Copies of this patent may be obtained for five cents each, by addressing the "Commissioner of Patents, Washington, D. C."